United States Patent
Xu et al.

(10) Patent No.: US 12,147,469 B2
(45) Date of Patent: Nov. 19, 2024

(54) METHOD AND SYSTEM FOR ACQUIRING SPECIES IDENTIFICATION NAMES AND READABLE STORAGE MEDIUM

(71) Applicant: Hangzhou Ruisheng Software Co., Ltd., Zhejiang (CN)

(72) Inventors: Qingsong Xu, Zhejiang (CN); Qing Li, Zhejiang (CN)

(73) Assignee: Hangzhou Ruisheng Software Co., Ltd., Zhejiang (CN)

( * ) Notice: Subject to any disclaimer, the term of this patent is extended or adjusted under 35 U.S.C. 154(b) by 142 days.

(21) Appl. No.: 17/737,926

(22) Filed: May 5, 2022

(65) Prior Publication Data

US 2022/0269721 A1 Aug. 25, 2022

Related U.S. Application Data

(63) Continuation-in-part of application No. PCT/CN2020/122945, filed on Oct. 22, 2020.

(30) Foreign Application Priority Data

Nov. 6, 2019 (CN) .......................... 201911077190.6
Jan. 20, 2022 (CN) .......................... 202210066948.1

(51) Int. Cl.
*G06F 17/00* (2019.01)
*G06F 7/00* (2006.01)
(Continued)

(52) U.S. Cl.
CPC ............ *G06F 16/58* (2019.01); *G06F 16/538* (2019.01); *G06F 16/55* (2019.01)

(58) Field of Classification Search
CPC ......... G06F 16/58; G06F 16/55; G06F 16/538
(Continued)

(56) References Cited

U.S. PATENT DOCUMENTS 6,092,059 A 7/2000 Straforini et al.
9,678,992 B2 * 6/2017 Wang ..................... G06F 16/58
(Continued)

FOREIGN PATENT DOCUMENTS

CN 101916382 12/2010
CN 102713905 10/2012
(Continued)

OTHER PUBLICATIONS

"Office Action of China Counterpart Application", issued on Jan. 7, 2022, p. 1-p. 7.
(Continued)

*Primary Examiner* — Pavan Mamillapalli
(74) *Attorney, Agent, or Firm* — JCIPRNET

(57) ABSTRACT

A method and system for acquiring species identification names and a readable storage medium are provided. The method includes: identifying a species image provided by a user according to a species identification model and acquiring a species name; acquiring a plurality of candidate species names according to a species name database; and acquiring a species identification result name according to geographical area information and/or confidence coefficients of the candidate species names. The candidate species names include a plurality of conventional names. The method further includes: determining whether the species name is present in the pre-established species name database, where the species name database records the common names of a same species in different geographical areas; and selecting a conventional name of the species name corresponding to the geographical area information from the species name database and acquiring and outputting the identification result of the species.

24 Claims, 8 Drawing Sheets

(51) Int. Cl.
*G06F 16/538* (2019.01)
*G06F 16/55* (2019.01)
*G06F 16/58* (2019.01)

(58) Field of Classification Search
USPC .......................................................... 707/736
See application file for complete search history.

(56) References Cited

U.S. PATENT DOCUMENTS

| | | | | |
|---|---|---|---|---|
| 10,888,085 | B1* | 1/2021 | Monk | G06F 16/51 |
| 11,586,665 | B2* | 2/2023 | Bustelo | G06F 16/538 |
| 2004/0225686 | A1* | 11/2004 | Li | G06F 16/58 |
| 2006/0036646 | A1* | 2/2006 | Mao | G06F 16/58 |
| 2006/0074771 | A1* | 4/2006 | Kim | G06F 16/5838 705/26.1 |
| 2006/0204143 | A1* | 9/2006 | Shiota | G06F 16/58 707/E17.026 |
| 2019/0012535 | A1* | 1/2019 | Collins | G06F 18/256 |
| 2021/0027061 | A1* | 1/2021 | Xu | G06V 10/454 |
| 2022/0269721 | A1* | 8/2022 | Xu | G06F 16/55 |
| 2022/0405322 | A1* | 12/2022 | Rao | G06F 16/738 |

FOREIGN PATENT DOCUMENTS

| | | |
|---|---|---|
| CN | 102819767 | 12/2012 |
| CN | 103455167 | 12/2013 |
| CN | 103793402 | 5/2014 |
| CN | 105549757 | 5/2016 |
| CN | 105955474 | 9/2016 |
| CN | 106605254 | 4/2017 |
| CN | 107392091 | 11/2017 |
| CN | 109359200 | 2/2019 |
| CN | 107741946 | 3/2019 |
| CN | 109447150 | 3/2019 |
| CN | 110210434 | 9/2019 |
| CN | 110287116 | 9/2019 |
| CN | 110378303 | 7/2021 |
| CN | 108256568 | 10/2021 |
| CN | 110851638 | 6/2023 |

OTHER PUBLICATIONS

"Office Action of China Counterpart Application", issued on Apr. 7, 2022, p. 1-p. 6.

"International Search Report (Form PCT/ISA/210) of PCT/CN2020/122945," mailed on Jan. 20, 2021, with English translation thereof, pp. 1-4.

"Written Opinion of the International Searching Authority (Form PCT/ISA/237) of PCT/CN2020/122945," mailed on Jan. 20, 2021, pp. 1-5.

Delectis Florae Reipublicae Popularis Sinicae Agendae Academiae Sinicae Edita, "Solanaceae—The Nightshade Family", Flora of China, Dec. 31, 2016, with partial English translation thereof, pp. 1-7. vol. 67, No. 1, Science Press, Beijing.

"Rejection Decision of China Counterpart Application", issued on Jun. 22, 2022, p. 1-p. 5.

"Review Decision Letter of China Counterpart Application", issued on Jul. 29, 2022, p. 1.

"Office Action of China Counterpart Application", issued on Aug. 10, 2022, p. 1-p. 7.

"Office Action of China Counterpart Application", issued on Nov. 8, 2022, p. 1-p. 8.

"Office Action of China Counterpart Application", issued on Mar. 16, 2023, p. 1-p. 5.

"Notice of allowance of China Counterpart Application", issued on May 2, 2023, p. 1-p. 2.

* cited by examiner

METHOD AND SYSTEM FOR ACQUIRING SPECIES IDENTIFICATION NAMES AND READABLE STORAGE MEDIUM

CROSS-REFERENCE TO RELATED APPLICATION

This application is a continuation-in-part of international PCT application serial no. PCT/CN2020/122945, filed on Oct. 22, 2020, which claims a priority and benefit of China patent application No. 201911077190.6 filed on Nov. 6, 2019 and China patent application No. 202210066948.1 filed on Jan. 20, 2022. The entirety of each of the above-mentioned patent applications is hereby incorporated by reference herein and made a part of this specification.

BACKGROUND

Technical Field

The disclosure relates to the technical field of object identification, and in particular, relates to a method and system for acquiring species identification names and a readable storage medium.

Description of Related Art

In recent years, the application of artificial intelligence image identification technology has become increasingly widespread. For example, the artificial intelligence image identification technology may be used to identify species in images. When the existing artificial intelligence image identification technology identifies a species in an image, it only identifies the biological name of the species and cannot be used to identify the common names of the species in different geographical areas.

However, the same species may have different common names in different regions. For instance, tomatoes, red persimmons, fire persimmons, tomato persimmons, and foreign persimmons that are called in different regions are actually the same species. Potatoes, spuds, and taros also refer to the same species. Sweet potatoes, yam beams, sweet yams, and red potatoes refer to the same species, and guavas, ba le, and chicken shit fruit also refer to the same species.

Similarly, the same species may have different common names in different countries. For instance, in the United Kingdom and the United States, many of the same species have different names, e.g., eggplant and aubergine both mean eggplant. Even different states or regions in the United States have different common names for the same species.

Therefore, there is a need for new technology.

SUMMARY

The disclosure provides a method and device for acquiring species identification names, an electronic apparatus, and a computer-readable storage medium to solve the problem that common names of a species cannot be identified in the related art. The specific technical solutions are provided as follow.

In the first aspect, the disclosure provides a method for acquiring species identification names, and the method includes the following steps.

An image uploaded by a user is acquired, and the image includes a species to be identified.

A species name in the image is identified through a pre-trained and pre-established species identification model. The species identification model is a model based on a neural network.

It is determined whether the species name is present in the pre-established species name database. The species name database records common names of a same species in different geographical areas.

If yes is determined, geographical area information where the user is located is acquired, a conventional name of the species name corresponding to the geographical area information is selected from the species name database, and an identification result of the species is acquired and outputted.

Optionally, if it is determined that the species name is not present in the pre-established species name database, the species name is treated as the identification result of the species.

Optionally, a professional scientific name is treated as an entry for each species in the species name database, and the common names of the species in different geographical areas are correspondingly stored under the entry.

Optionally, the step of outputting the identification result of the species further includes the following step.

Species information, common names in other geographical areas, and/or a professional scientific name of the species are outputted.

Optionally, the species identification model identifies that the species names in the image may include species names of a plurality of similar species.

The step of selecting the conventional name of the species name corresponding to the geographical area information from the species name database as the identification result of the species and outputting the identification result of the species further includes the following step.

The following step is performed for each species name.

The conventional name of the species name corresponding to the geographical area information is selected from the species name database as one identification result of the species, and the identification result of the species is outputted.

Optionally, the method further includes the following step.

Regarding a plurality of species names, a plurality of identification results of the species are sequentially outputted according to a descending arrangement order of accuracy rates of the species names.

Optionally, the method for acquiring species identification names further includes the following steps.

A suggested name of the species uploaded by the user is received.

The species name, the geographical area information, and the suggested name are associated and stored.

Optionally, the method for acquiring species identification names further includes the following steps.

It is determined whether storage records of the species name, the geographical area information, and the suggested name exceed a predetermined threshold.

if yes is determined, the suggested name is recorded in the species name database as the conventional name of the species name in the geographical area corresponding to the geographical area information.

In the second aspect, the disclosure further provides a device for acquiring species identification names, and the device includes an acquisition module, an identification module, a first determination module, and an output module.

The acquisition module is configured to acquire an image uploaded by a user, and the image includes a species to be identified.

The identification module is configured to identify a species name in the image through a pre-trained and pre-established species identification model. The species identification model is a model based on a neural network.

The first determination module is configured to determine whether the species name is present in a pre-established species name database. The species name database records common names of a same species in different geographical areas. The output module is triggered if yes is determined.

The output module is configured to acquire geographical area information where the user is located, selects a conventional name of the species name corresponding to the geographical area information from the species name database, and acquires and outputs an identification result of the species.

Optionally, if the first determination module determines that the species name is not present in the pre-established species name database, the species name is treated as the identification result of the species.

Optionally, a professional scientific name is treated as an entry for each species in the species name database, and the common names of the species in different geographical areas are correspondingly stored under the entry.

Optionally, when outputting the identification result of the species, the output module is further configured to perform the following operation.

Species information, common names in other geographical areas, and/or a professional scientific name of the species are outputted.

Optionally, the species identification model identifies that the species names in the image may include species names of a plurality of similar species.

The output module selects the conventional name of the species name corresponding to the geographical area information from the species name database as the identification result of the species and outputs the identification result of the species. The following operation is further included.

The following step is performed for each species name.

The conventional name of the species name corresponding to the geographical area information is selected from the species name database as one identification result of the species, and the identification result of the species is outputted.

Optionally, the output module is further configured to perform the following operation.

Regarding a plurality of species names, a plurality of identification results of the species are sequentially outputted according to a descending arrangement order of accuracy rates of the species names.

Optionally, the device for acquiring species identification names may further include a receiving module and a storage module.

The receiving module receives a suggested name of the species uploaded by the user.

The storage module is configured to associate and store the species name, the geographical area information, and the suggested name.

Optionally, the device for acquiring species identification names may further include a second determination module.

The second determination module is configured to determine whether storage records of the species name, the geographical area information, and the suggested name exceed a predetermined threshold. If yes is determined, an update module is triggered.

The update module is configured to record the suggested name in the species name database as the conventional name of the species name in the geographical area corresponding to the geographical area information.

In the third aspect, the disclosure further provides an electronic apparatus including a processor, a communication interface, a memory, and a communication bus. The processor, the communication interface, and the memory communicate with one another through the communication bus.

The memory is configured to store a computer program.

The processor is configured to implement the steps of the method for acquiring species identification names as described in the first aspect when executing the program stored in the memory.

In the fourth aspect, the disclosure further provides a computer-readable storage medium. The computer-readable storage medium stores a computer program, and the computer program implements the steps of the method for acquiring species identification names as described in the first aspect when being executed by a processor.

The disclosure provides a method for displaying species identification result names in the methods for acquiring species identification names, and the method includes the following steps.

A species image provided by a user is identified according to a species identification model, and a species identification result name is acquired.

Modification information submitted by the user for the species identification result name and a number of times of modification belonging to the same modification information among pieces of modification information submitted by a plurality of users are acquired.

A candidate species identification result name is determined according to the modification information submitted by the user and the number of times of modification.

The species identification result name is adjusted according to the candidate species identification result name.

In some embodiments, after the modification information of the species identification result name of a specific species is submitted by the user, an image belonging to the same species and subsequently provided by the current user use the modified species identification result name submitted by the user.

In some embodiments, when the number of times of modification of the same modification information among the pieces of modification information for a species identification result name submitted by multiple users is greater than a predetermined first threshold, the same modification information is treated as the species identification result name of the species, and the species identification model is optimized according to the species identification result name and the corresponding species images.

In some embodiments, when the numbers of times of modification of pieces of modification information of different species identification result names of a specific species are all greater the predetermined first threshold, the pieces of modification information of the different species identification result names are sorted according to the numbers of times of modification, and the piece modification information ranked first is treated as the species identification result name of the species. The piece of modification information ranked first is treated as the species identification result name of the species.

In some embodiments, the species identification result name includes a species identification name and a common name.

In some embodiments, if the confidence coefficient of the species identification name in the species identification result name is greater than a second predetermined threshold and modification information for the current species identification name is submitted by a user, reminder information is outputted.

In some embodiments, when the modification information of a specific species identification name submitted by a plurality of users does not belong to a range of the species identification result name of the species identification model, the number of times of modification of the same modification information submitted by the users is acquired. When the number of times of modification is greater than a third predetermined threshold, the species identification model is used to perform sample training on the same modification information and the corresponding species images to establish an added identifiable species belonging to the species identification model.

In some embodiments, when a plurality of users submit the same modification information among the pieces of modification information of the common name of a specific species identification result name, the number of times of modification of the same modification information and corresponding location information of the users are acquired. When the location information of the users submitting same common name modification information has a same regional attribute and the number of times of modification of the same common name modification information with the same regional attribute exceeds a fourth threshold, the same common name modification information is treated as the common name in the species identification result name submitted by subsequent users with the same regional attribute.

In some embodiments, when numbers of pieces of the same common name modification information of a specific species with the same regional attribute are submitted, the pieces of the same common name modification information are sorted and displayed according to the number of times of modification.

In some embodiments, the location information of the users includes regular location information and current location information, and the regular location information is set by the users or acquired according to the location information with a largest number of occurrences acquired from historical species images of the users.

In some embodiments, when the current location information of the species picture of a specific species provided by the user is inconsistent with the regular location information of the user, in addition to displaying the common name of the species corresponding to the regional attribute to which the regular location information of the user belongs, the common name of the species corresponding to the regional attribute to which the user's current location information belongs is also displayed.

According to another aspect of the disclosure, a readable storage medium storing a program is provided. The program implements the abovementioned method for displaying species identification result names when being executed.

According to another aspect of the disclosure, a system for displaying species identification result names is provided, and the system includes a processor and a memory. The memory stores a program, and the program implements the abovementioned method for acquiring species identification names and the method for displaying species identification result names when being executed by the processor.

Compared to the related art, beneficial effects generated by the technical solutions of the disclosure include the following.

In the disclosure, a species name database is pre-established. The species name database records common names of a same species in different geographical areas. After an image uploaded by a user is acquired, the species name in the image is identified by the species identification model first, and it is then determined whether the species name is present in the pre-established species name database. If yes is determined, the geographical area information where the user is located is acquired, the conventional name of the species name corresponding to the geographical area information is selected from the species name database, and the identification result of the species is acquired and outputted. In the disclosure, the species name identified by the species identification model is not directly outputted to the user. Instead, according to the species name, the conventional name of the species to be identified in the current geographical area is determined from the species name database and is outputted to the user. Compared with the related art, in the disclosure, the species to be identified in the current geographical area is treated as the identification result and is displayed to the user, and improved user experience is thereby provided.

Other features of the disclosure and advantages thereof will become more apparent from the following detailed description of exemplary embodiments of the disclosure with reference to the accompanying drawings.

BRIEF DESCRIPTION OF THE DRAWINGS

The accompanying drawings, which form a part of the specification, illustrate embodiments of the disclosure and together with the description serve to explain the principles of the disclosure.

The disclosure may be more clearly understood from the following detailed description with reference to the accompanying drawings described as follows.

Figure 1:
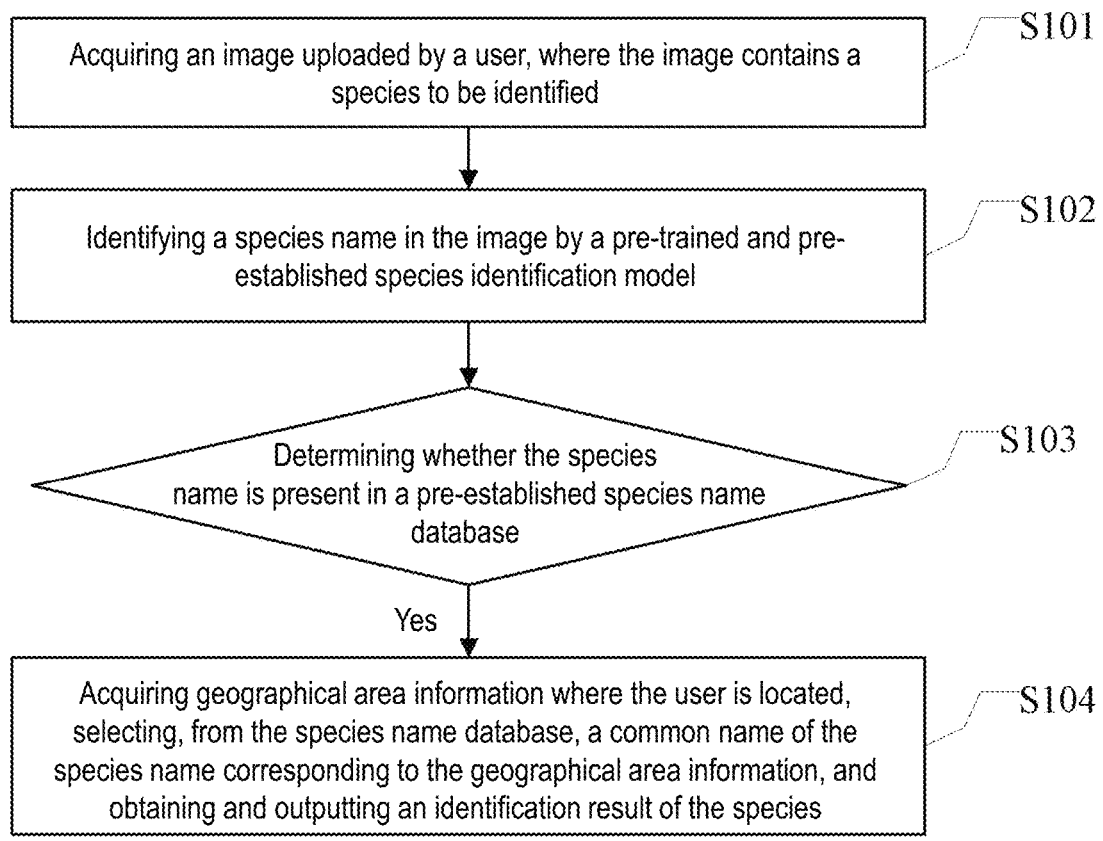
FIG. 1 is a schematic flow chart of a method for acquiring species identification names according to an embodiment of the disclosure.

Note that in the embodiments described below, the same reference numerals are used in common between different accompanying drawings to denote the same parts or parts having the same function, and repeated description thereof is omitted. In some cases, similar numbers and letters are used to denote similar items, and therefore, once an item is defined in one accompanying drawing, it does not require further discussion in subsequent accompanying drawings.

For ease of understanding, the position, dimension, range, and the like of each structure shown in the accompanying drawings and the like may not represent actual positions, sizes, ranges, and the like. Therefore, the disclosure is not limited to the positions, dimensions, ranges, and the like disclosed in the accompanying drawings and the like.

DESCRIPTION OF THE EMBODIMENTS

Various exemplary embodiments of the disclosure are described in detail as follows with reference to the accompanying drawings. It should be noted that the relative arrangement of the components and steps, the numerical expressions and numerical values set forth in these embodiments do not limit the scope of the disclosure unless specifically stated otherwise.

The following description of at least one exemplary embodiment is merely illustrative in nature and is in no way intended to limit the disclosure, its application or uses in any way. That is, the structures and methods herein are shown by way of example to illustrate various embodiments of the structures and methods in the disclosure. A person having ordinary skill in the art may appreciate, however, that they are merely illustrative, and not exhaustive, of the ways in which the disclosure may be practiced. Further, the accompanying drawings are not necessarily to scale and some features may be exaggerated to show details of particular components.

Techniques, methods, and apparatuses known to a person having ordinary skill in the art may not be discussed in detail, but where appropriate, such techniques, methods, and apparatuses should be considered part of the authorized specification.

In all examples shown and discussed herein, any specific value should be construed as illustrative only and not as limiting. Accordingly, other examples of exemplary embodiments may have different values.

In order to solve the problem found in the related art, the embodiments of the disclosure provide a method and device for acquiring species identification names, and electronic apparatus, and a computer-readable storage medium.

Note that the method for acquiring species identification names provided by the embodiments of the disclosure may be applied in the device for acquiring species identification names, and the device for acquiring species identification names may be configured on an electronic apparatus. The electronic apparatus may be a personal computer, a mobile terminal, etc., and the mobile terminal may be a hardware apparatus featuring various operating systems, such as a mobile phone, a tablet computer, and the like.

FIG. 1 is a schematic flow chart of a method for acquiring species identification names according to an embodiment of the disclosure. With reference to FIG. 1, a method for acquiring species identification names may include the following steps.

A species image provided by a user is identified according to a species identification model, and a species name is acquired.

A plurality of candidate species names are acquired according to a species name database.

A species identification result name is acquired according to geographical area information and/or confidence coefficients of the candidate species names.

The species identification model is a model pre-trained and pre-established based on a neural network, and the species image includes a species to be identified.

In step S101, an image uploaded by a user is acquired, where the image includes a species to be identified.

In practical applications, the image uploaded by the user may be a single picture or a captured video. The single picture may be a picture currently captured by the user or a picture selected by the user from the mobile phone album. If it is a video, the picture may be acquired by acquiring each video frame. The species to be identified may include: plants, animals, and the like.

In step S102, a species name in the image is identified through a pre-trained and pre-established species identification model.

The species identification model is a model based on a neural network. The neural network may include a deep convolutional neural network (CNN) or a deep residual network (Resnet). The deep convolutional neural network is a deep feedforward neural network, which uses a convolution kernel to scan a species picture, extracts features to be identified in the species picture, and then identifies the features to be identified of species. In addition, in the process of identifying the species picture, an original species picture may be directly inputted into the deep convolutional neural network model without preprocessing the species picture. Compared with other identification models, the deep convolutional neural network model has higher identification accuracy and identification efficiency. Compared with the deep convolutional neural network model, in the deep residual network model, the addition of the identity mapping layer may avoid the saturation or even decline of the accuracy caused by the convolutional neural network as the depth of the network (the number of layers in the network) increases. In the residual network model, the identity mapping function of the identity mapping layer needs to be satisfied. The sum of inputs of the identity mapping function and the residual network model is equal to the output of the residual network model. After the introduction of identity mapping, the residual network model shows obvious changes to the output, so the identification accuracy and efficiency of species identification may be greatly improved.

The species identification model may be trained and obtained through the following steps. For each species, a plurality of species pictures are obtained to form a training sample set. Each species picture sample in the training sample set is labeled to label the species name in each species picture sample. The neural network is trained through the labeled training sample set to obtain the species identification model. The species picture samples in the training sample set may be species pictures acquired from pictures taken by users or acquired from albums or may be species pictures acquired from the network or a database.

An image (a single picture or a single video frame of a video frame) uploaded by the user is inputted into the species identification model described above. The species identification model may output a model identification result after the identification process, and the model identification result represents the possible species name identified by the species identification model for the species to be identified in the image. The model identification result may include the name of the most likely identified species or may include multiple species names, and the multiple species names may be arranged in descending order according to the likelihood.

The candidate species names include a plurality of conventional names, and the step of acquiring the candidate species names according to the species name database includes the following steps.

In step S103, it is determined whether the species name is present in the pre-established species name database. The species name database records common names of a same species in different geographical areas. Step S104 is performed if yes is determined, and the species name is treated as an identification result of the species and is outputted if no is determined.

To be specific, a professional scientific name may be treated as an entry for each species in the species name database, and the common names of the species in different geographical areas are correspondingly stored under the entry. For instance, the common names of potatoes (professional scientific name: *Solanum tuberosum* L.) in different geographical areas of China include yam eggs, foreign taros, foreign mountain taros, foreign taro roots, fragrant taros, foreign sweet potatoes, mountain taros, sun taros, ground eggs, spuds, etc. Potatoes have different common names in different countries, such as Irish jicama in the United States, Dutch potatoes in Russia, ground apples in France, ground pears in Germany, ground beans in Italy, and baba in Peru. Therefore, the different common names of potatoes in different geographical areas are stored under the entry of potato (professional scientific name: *Solanum tuberosum* L.).

It can be understood that each species picture sample in the training sample set used to train the species identification model is marked with the professional scientific name of the species. In this way, when the species identification model identifies an image, the identified species name is the professional scientific name of the species. Next, in step S103, a search may be performed in the species name database according to the professional scientific name of the species to determine whether the professional scientific name is present. Step S104 may be further performed if yes is determined, and the professional scientific name is directly treated as the identification result of the species and outputted if no is determined.

The species identification result name includes the identification result of the species, and the step of acquiring the species identification result name according to the geographical area information and the confidence coefficients of the candidate species names further includes the following step.

In step S104, geographical area information where the user is located is acquired, a conventional name of the species name corresponding to the geographical area information is selected from the species name database, and the identification result of the species is acquired and outputted.

The geographical area information where the user is located may be determined by the location information when the image is uploaded, and the location information includes but not limited to GPS information. To be specific, the current location information of the user is acquired when the user uploads the image. If the current location information of the user is displayed as "The Bund of Shanghai", it may be determined that the geographical area information where the user is located is Shanghai, China. If the current location information of the user is displayed as "Columbia University, New York State", it is determined that the geographical area information of the user is New York State, USA.

Next, the entry corresponding to the species name is found in the species name database, and the conventional name corresponding to the geographical area information where the user is located is found from the entry. As such, the identification result of the species is obtained, and the identification result is outputted to the user, so as to show the user the conventional name of the species in the current geographical area. In addition, when the identification result of the species is outputted, other information such as species information, the common names in other geographical areas, and/or the professional scientific name, etc. of the species may also be outputted. To be specific, the conventional name of the species in the current geographical area may be placed at the front of the identification result introduction, followed by the species information of the species and then the common names of the species in other geographical areas are displayed, and finally its professional scientific name is displayed.

For instance, the species identification model identifies the species name as: *Solanum melongena*. If the geographical area information where the user is located is the United States, the identification result of the species is outputted and displayed as eggplant (that is, the conventional name for *Solanum* in the United States), if the geographical area information where the user is located is the United Kingdom, the identification result of the species is outputted and displayed as aubergine (that is, the conventional name for *Solanum* in the United Kingdom), if the geographical area information where the user is located is Guangdong, the identification result of the species is outputted and displayed as dwarf melon (that is, the conventional name for *Solanum* in Guangdong), if the geographical area information where the user is located is Beijing, the identification result of the species is outputted and displayed as qiezi (that is, the conventional name for *Solanum* in Beijing). The species information of eggplant (*Solanum melongena*) may also be displayed, as well as the common names used in other geographical areas, and finally its scientific name: *Solanum melongena* is displayed.

In practical applications, the species identification model identifies that the species names in the image may include species names of a plurality of similar species. The species names of these multiple similar species have their own possibilities. For each species name, the following steps may be performed. When the species name is present in the pre-established species name database, the conventional name of the species name corresponding to the geographical area information is selected from the species name database as an identification result of the species and is outputted. If the species name is not present in the pre-established species name database, the species name is treated as the identification result of the species. That is, for each possible species name identified by the species identification model, an identification result is outputted to the user, so as to show the user each possible identification result of the species to be identified in the image.

To be specific, for these multiple possible species names, the multiple identification results of the species may be sequentially outputted according to a descending arrangement order of accuracy rates of the multiple species names. For instance, the species identification model identifies the species to be identified in an image and outputs 4 possible species names. The species identification model shows a corresponding identification accuracy rate for each possible species name (the accuracy rate is used to indicate the possibility of the species name, and a high accuracy rate indicates that the possibility of the species name is high). When outputting the identification results, multiple identification results of the species may be outputted in sequence in a descending order of accuracy rates. In each identification result, the conventional name of the species in the current geographical area, the species information of the species, the common names in other geographical areas, and its professional scientific name are sequentially displayed in the above manner.

Figure 2A:
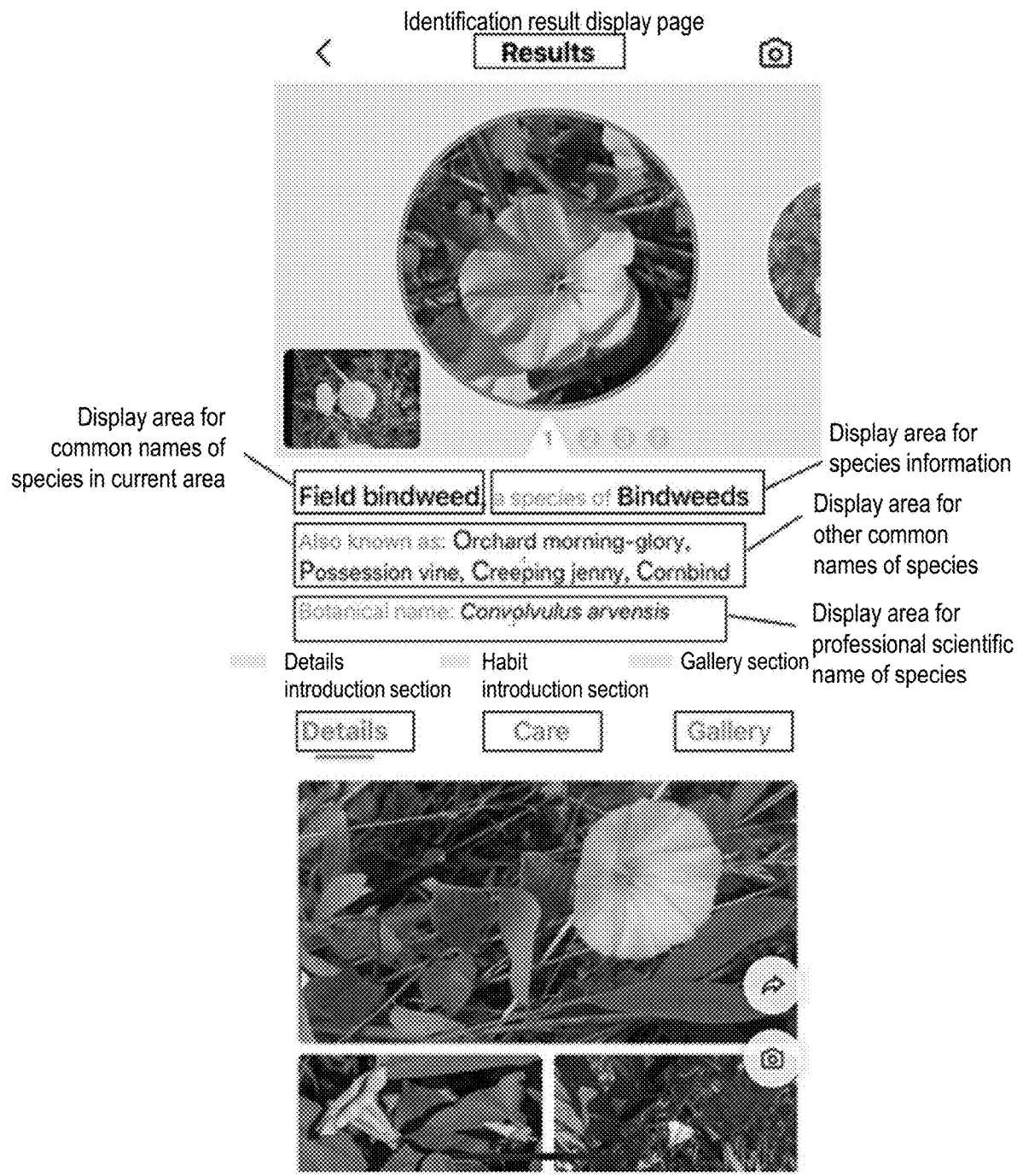
FIG. 2A and FIG. 2B are schematic pictures for displaying species identification results according to a specific embodiment of the disclosure.
Figure 2B:
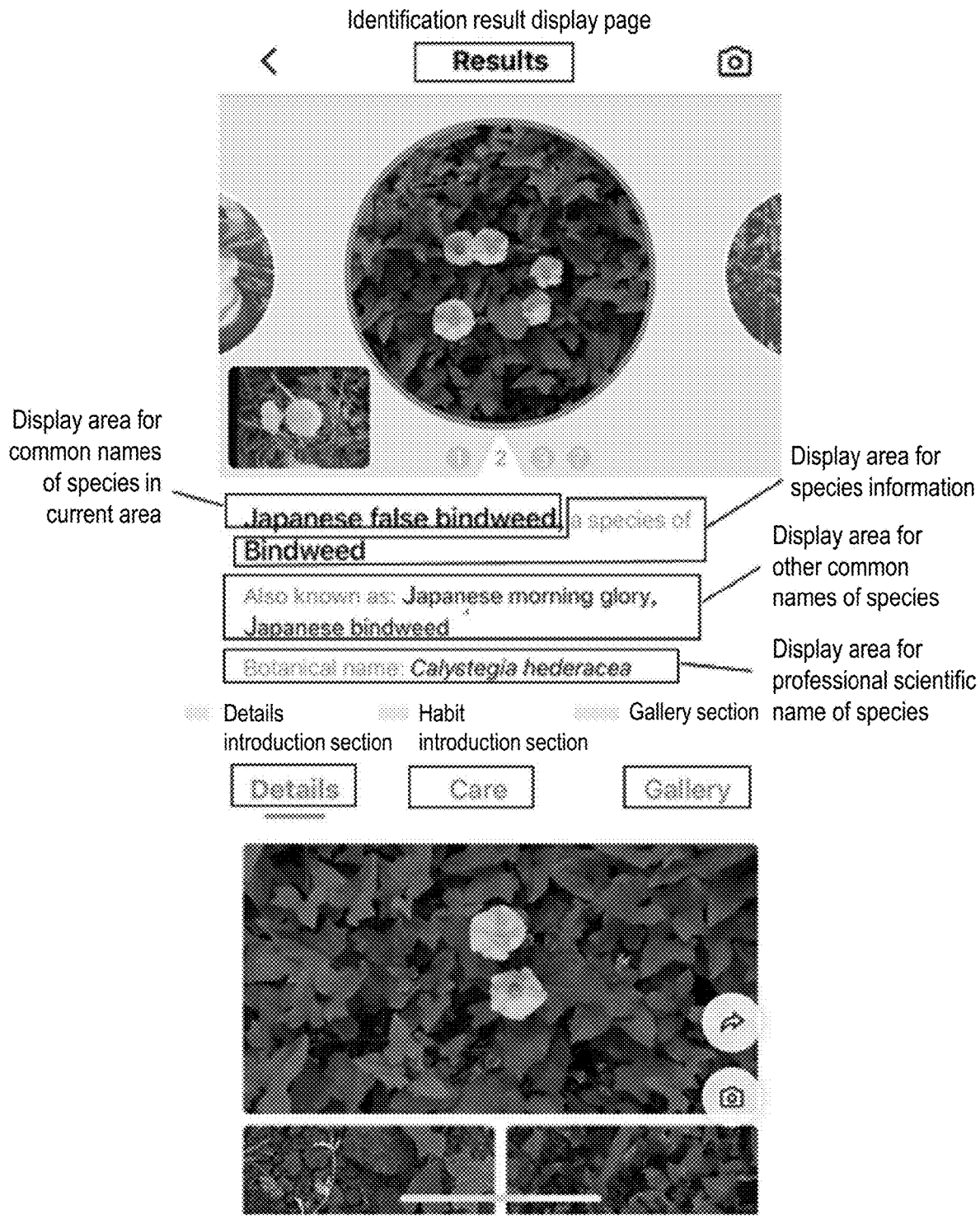
Figure 3A:
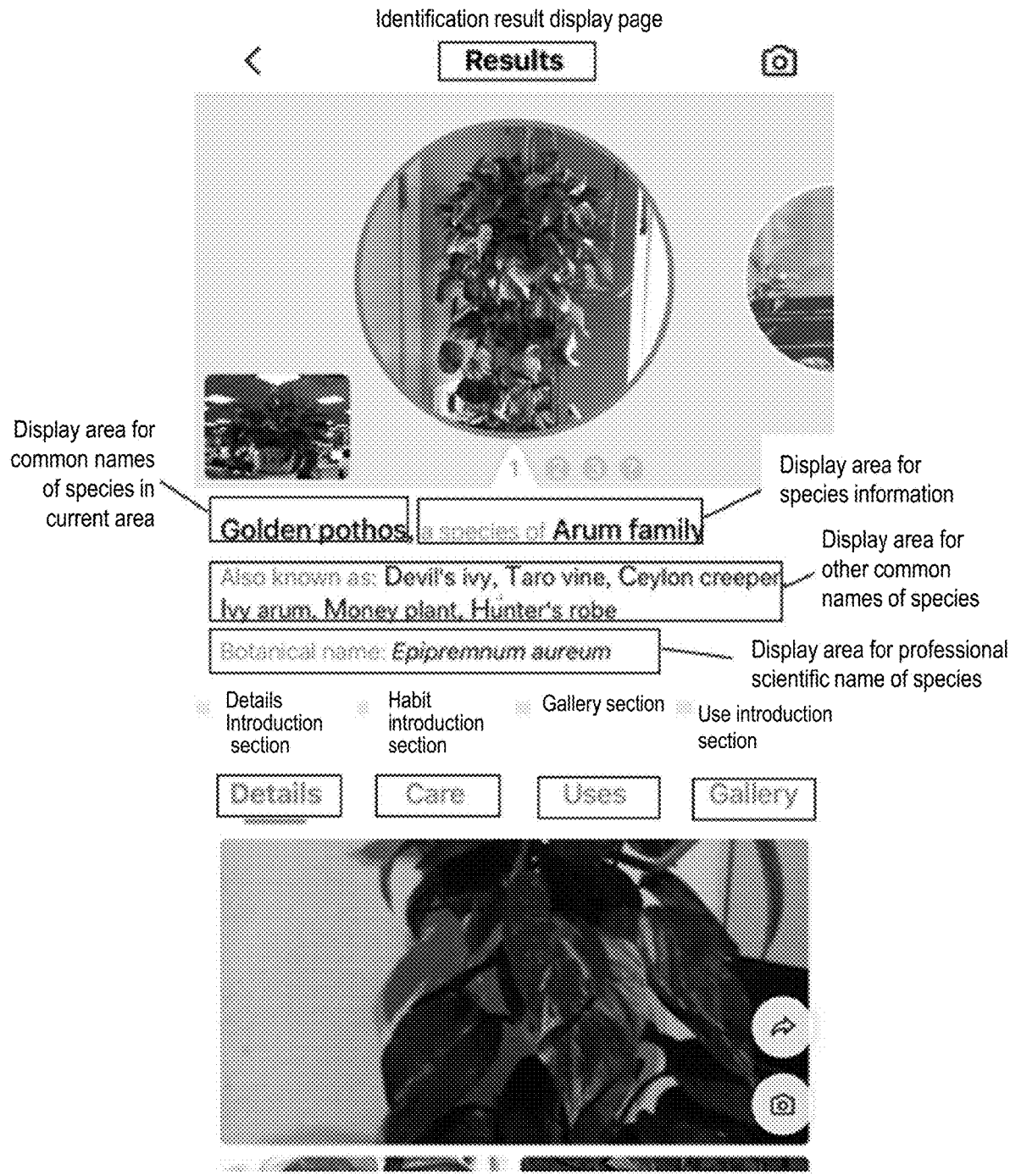
FIG. 3A and FIG. 3B are schematic pictures for displaying species identification results according to another specific embodiment of the disclosure.
Figure 3B:
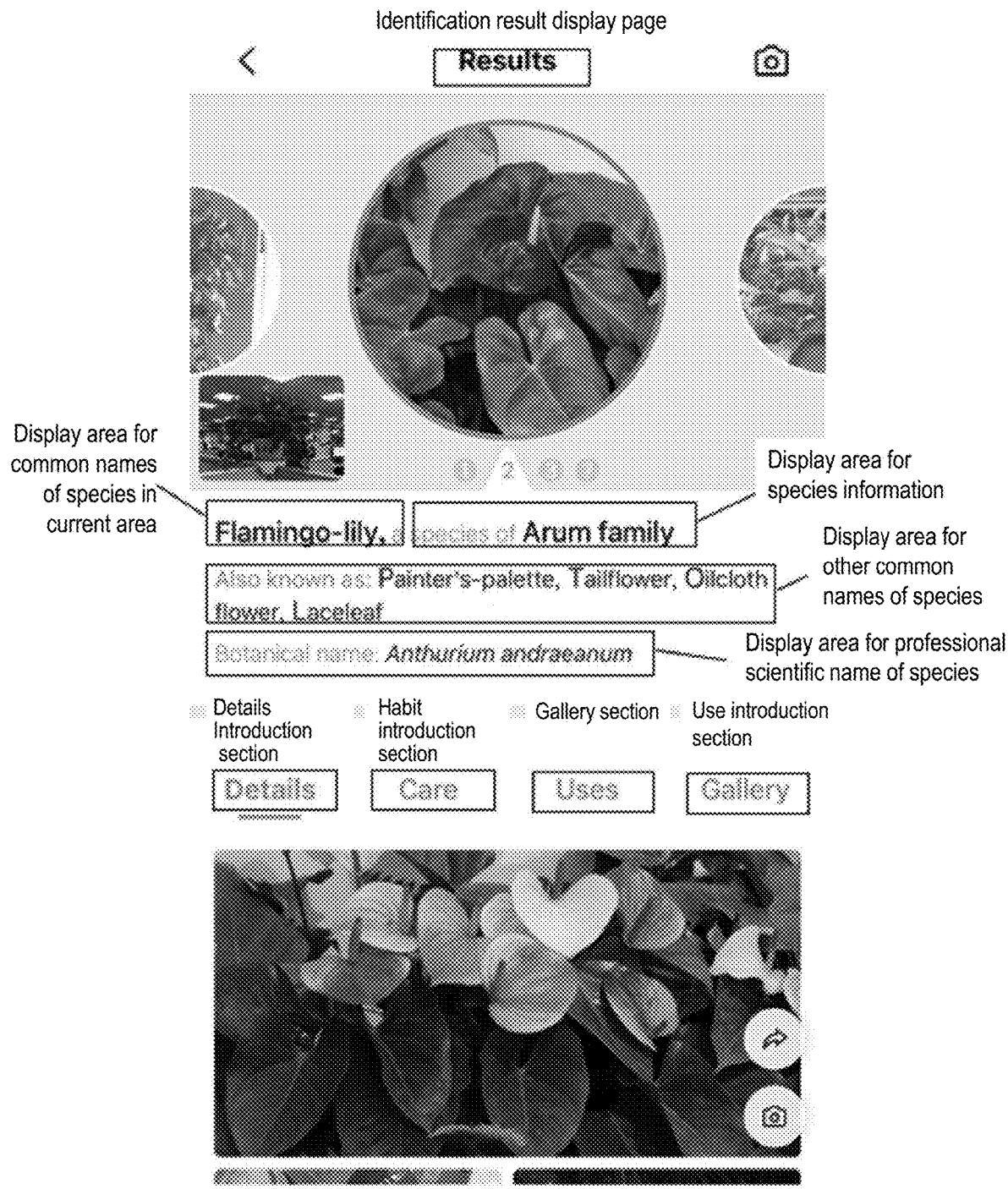

FIG. 2A and FIG. 2B show display interfaces of the identification results of the species to be identified, field bindweed. FIG. 2A shows the identification result corresponding to the species name with the highest identification accuracy rate, and FIG. 2B shows the identification result corresponding to the species name with the next highest identification accuracy rate. FIG. 3A and FIG. 3B show display interfaces of the identification results of the species to be identified, golden pothos. FIG. 3A shows the identification result corresponding to the species name with the highest identification accuracy rate, and FIG. 3B shows the identification result corresponding to the species name with the next highest identification accuracy rate. In each of the display interfaces shown in FIG. 2A, FIG. 2B, FIG. 3A, and FIG. 3B, the upper part displays the species pictures of the identification results, the lower left corner displays the picture uploaded by the user, the middle part displays the text information, and the lower part of the text information displays multiple species images of the identification results for the user to make comparison.

The text information in the middle shows the conventional name of the species in the current geographical area, the species information of the species, the conventional name in other geographical areas, and its professional scientific name. With reference to FIG. 2, the text information in the middle first shows the conventional name of the species in the current geographical area as "Field bindweed", and also gives the species information to which the species belongs as "Bindweed", then shows other common names of the species: "Orchard morning-glory, Possession vine, Creeping jenny, and Cornbind", and finally shows the professional scientific name of the species "*Convolvulus arvensis*". The content displayed by the text information in the middle of FIG. 2B, FIG. 3A, and FIG. 3B is similar to that of FIG. 2A, and details are not repeated herein.

Further, in order to improve the user experience, in this embodiment, if the user is not satisfied with each identification result of the species to be identified, the user may also input a suggested name of the species. To be specific, the method provided by this embodiment may further includes the following steps: a suggested name of the species uploaded by the user is received, and the species name, the geographical area information, and the suggested name are associated and stored.

Further, it may also be determined whether storage records of the species name, the geographical area information, and the suggested name exceed a predetermined threshold. If yes is determined, the suggested name is recorded in the species name database as the conventional name of the species name in the geographical area corresponding to the geographical area information. It may be understood that if a unique name of the species in the geographical area provided by more than a predetermined number of users in the current geographical area is the same suggested name, the suggested name may be considered to be the conventional name of the species in the geographical area. Therefore, the conventional name is added to the species name database, the species name database is updated, and the accuracy of species identification is thereby improved.

In addition, if the user is not satisfied with each identification result of the species to be identified, and the user cannot give his/her suggested name for the species, the user may also push the species to other users, ask other users to help identify the species, and give the conventional name of the species in the geographical area.

Figure 4:
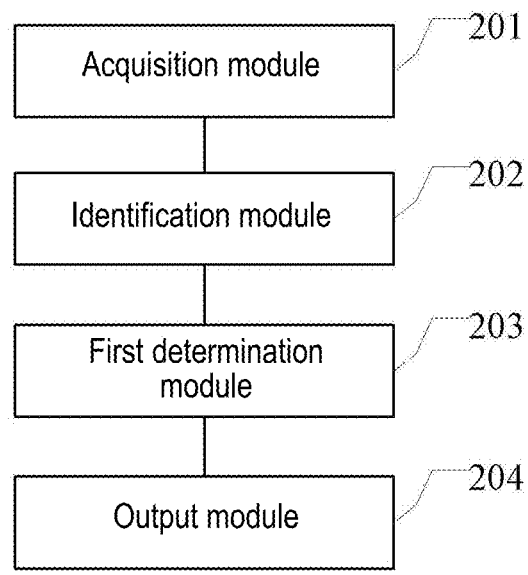
FIG. 4 is a schematic view of a structure of a device for acquiring species identification names according to an embodiment of the disclosure.

Corresponding to the above method embodiments, an embodiment of the disclosure further provides a device for acquiring species identification names. With reference to FIG. 4, FIG. 4 is a schematic view of a structure of a device for acquiring species identification names according to an embodiment of the disclosure. A device for acquiring species identification names may include an acquisition module 201, an identification module 202, a first determination module 203, and an output module 204.

The acquisition module 201 is configured to acquire an image uploaded by a user, and the image includes a species to be identified.

The identification module 202 is configured to identify a species name in the image through a pre-trained and pre-established species identification model. The species identification model is a model based on a neural network.

The first determination module 203 is configured to determine whether the species name is present in a pre-established species name database. The species name database records common names of a same species in different geographical areas.

The output module 204 is configured for acquiring geographical area information where the user is located in response to presence of the species name in the pre-established species name database, selecting a conventional name of the species name corresponding to the geographical area information from the species name database, and acquiring and outputting an identification result of the species. Further, if the species name is not present in the pre-established species name database, the species name is treated as the identification result of the species and is outputted.

Optionally, if the first determination module 203 determines that the species name is not present in the pre-established species name database, the species name is treated as the identification result of the species.

Optionally, a professional scientific name is treated as an entry for each species in the species name database, and the common names of the species in different geographical areas are correspondingly stored under the entry.

Optionally, when outputting the identification result of the species, the output module 204 is further configured to perform the following operation.

Species information, common names in other geographical areas, and/or a professional scientific name of the species are outputted.

Optionally, when the species identification model identifies that the species name in the image includes species names of a plurality of similar species and all of the species names are present in the pre-established species name database, the output module 204 selects the conventional name of the species name corresponding to the geographical area information from the species name database as the identification result of the species and outputs the identification result of the species. The following operation is further included.

The following step is performed for each species name.

The conventional name of the species name corresponding to the geographical area information is selected from the species name database as one identification result of the species, and the identification result of the species is outputted.

Optionally, the output module 204 is further configured to perform the following operation.

Regarding the multiple species names, a plurality of identification results of the species are sequentially outputted according to a descending arrangement order of accuracy rates of the species names.

Optionally, the device for acquiring species identification names may further include a receiving module and a storage module.

The receiving module receives a suggested name of the species uploaded by the user.

The storage module is configured to associate and store the species name, the geographical area information, and the suggested name.

Optionally, the device for acquiring species identification names may further include a second determination module.

The second determination module is configured to determine whether storage records of the species name, the geographical area information, and the suggested name exceed a predetermined threshold. If yes is determined, an update module is triggered.

The update module is configured to record the suggested name in the species name database as the conventional name of the species name in the geographical area corresponding to the geographical area information.

Figure 5:
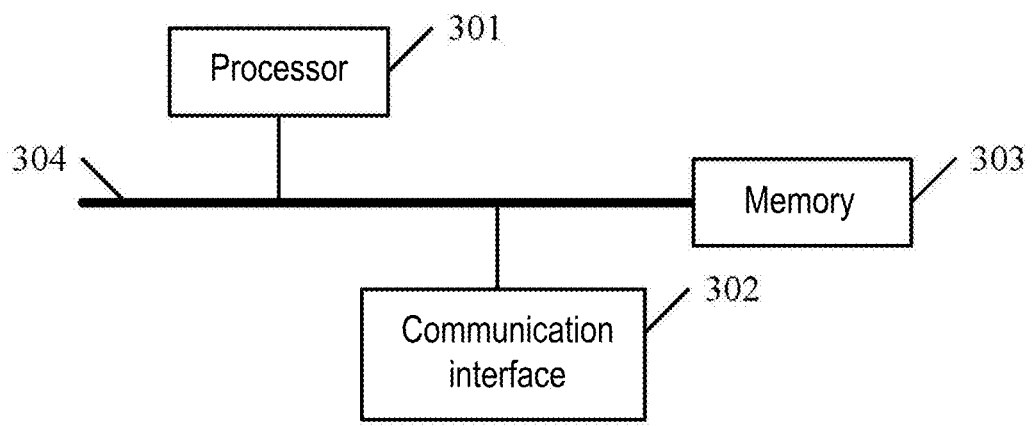
FIG. 5 is a schematic view of a structure of an electronic apparatus according to an embodiment of the disclosure.

An embodiment of the disclosure further provides an electronic apparatus. FIG. 5 is a schematic view of a structure of an electronic apparatus according to an embodiment of the disclosure. With reference to FIG. 5, an electronic apparatus includes a processor 301, a communication interface 302, a memory 303, and a communication bus 304. The processor 301, the communication interface 302, and the memory 303 communicate with one another through the communication bus 304.

The memory 303 is configured to store a computer program.

The processor 301 is configured to implement the following steps when executing a program stored in the memory 303.

An image uploaded by a user is acquired, where the image includes a species to be identified.

A species name in the image is identified through a pre-trained and pre-established species identification model. The species identification model is a model based on a neural network.

It is determined whether the species name is present in the pre-established species name database. The species name database records common names of a same species in different geographical areas.

If yes is determined, geographical area information where the user is located is acquired, a conventional name of the species name corresponding to the geographical area information is selected from the species name database, and an identification result of the species is acquired and outputted.

For the specific implementation of each step of the method and related explanation content, reference may be made to the method embodiments shown in FIG. 1 above, which will not be repeated herein.

Besides, other implementation manners of the method for acquiring species identification names implemented by the processor 301 by executing the program stored in the memory 303 are the same as the implementation manners mentioned in the foregoing method embodiments, and will not be repeated herein.

The abovementioned communication bus in the electronic apparatus may be a peripheral component interconnect (PCI) standard bus or an extended industry standard architecture (EISA) bus or the like. The communication bus may be divided into an address bus, a data bus, a control bus, etc. For ease of illustration, only one thick line is presented in the figure, but it does not mean that there is only one bus or one type of bus.

The communication interface is configured to implement communication between the electronic apparatus and other apparatuses.

The memory may include a random access memory (RAM) or a non-volatile memory (NVM), such as at least one magnetic disk storage. Optionally, the memory may also be at least one storage device located away from the aforementioned processor.

The processor may be a general-purpose processor, a central processing unit (CPU), a network processor (NP), a digital signal processor (DSP), an application specific integrated circuit (ASIC), a field-programmable gate array (FPGA), or other components such as a programmable logic device, a discrete gate, a transistor logic device, and a discrete hardware component.

An embodiment of the disclosure further provides a computer-readable storage medium. The computer-readable storage medium stores a computer program, and the computer program implements the steps of the method for acquiring species identification names when being executed by a processor.

Figure 6:
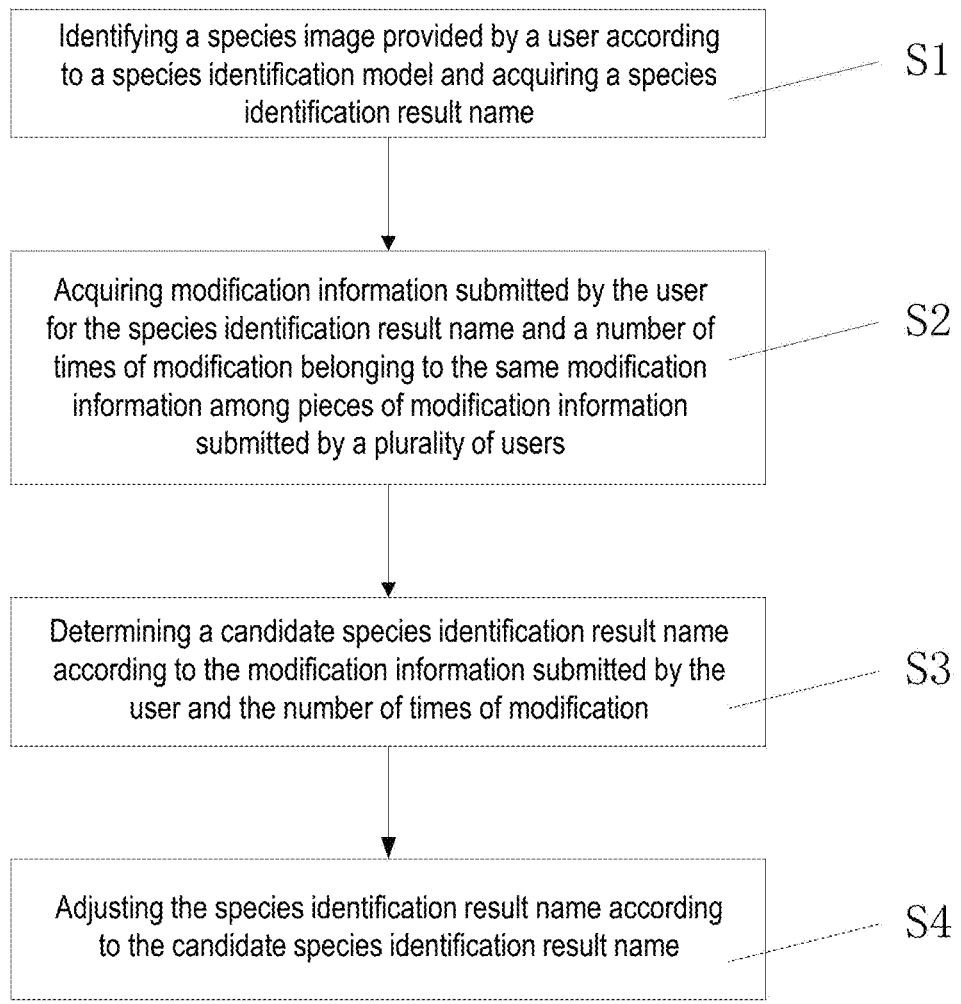
FIG. 6 is a flow chart of a method for acquiring species identification names according to another embodiment of the disclosure.

FIG. 6 is a flow chart of a method for acquiring species identification names according to another embodiment of the disclosure, and this method may be implemented in an application (app) installed on a smart terminal such as a mobile phone or a tablet computer. As shown in FIG. 6, the method includes the following steps.

In step S1: a species image provided by a user is identified according to a species identification model, and a species identification result name is acquired.

The step of acquiring candidate species names according to a species name database includes the following steps.

In step S2, modification information submitted by the user for the species identification result name and a number of times of modification belonging to the same modification information among pieces of modification information submitted by a plurality of users are acquired.

In step S3, a candidate species identification result name is determined according to the modification information submitted by the user and the number of times of modification.

The candidate species names include the modification information, and the confidence coefficients are related to the number of times of modification. The species name database includes the modification information submitted by the user. The step of acquiring the candidate species names according to the species name database includes the following steps. In step S4, the species identification result name is adjusted according to the candidate species identification result name.

The species identification model may be a neural network model, specifically a convolutional neural network model or a residual network model. The convolutional neural network model is a deep feedforward neural network, which uses a convolution kernel to scan a species image, extracts a plurality of features to be identified in the species image, and then identifies the features to be identified of species. In addition, in the process of identifying the species image, an original species image may be directly inputted into the convolutional neural network model without preprocessing the species image. Compared with other identification models, the convolutional neural network model has higher identification accuracy and identification efficiency.

Compared with the convolutional neural network model, in the residual network model, the addition of the identity mapping layer may avoid the saturation or even decline of the accuracy as the depth of the network (the number of layers in the network) increases. In the residual network model, the identity mapping function of the identity mapping layer needs to be satisfied. The sum of inputs of the identity mapping function and the residual network model is equal to the output of the residual network model. After the introduction of identity mapping, the residual network model shows obvious changes to the output, so the identification accuracy and identification efficiency of features of the species may be greatly improved.

In some embodiments, training of a feature classification model may include the following steps.

A first sample set of species images with a predetermined number of species images labeled with a plurality of pieces of feature information is acquired.

A specific proportion of species images are determined from the first sample set as a first training set.

The feature classification model is trained using the first training set.

The training ends when a first training accuracy rate is greater than or equal to a first predetermined accuracy rate, and the trained feature classification model is obtained.

To be specific, in the first sample set, a large number of species images may be included, and each species image is correspondingly labeled with its corresponding multiple features. The species images are inputted into the feature classification model to generate outputted feature information. Next, according to a comparison result between the outputted feature information and labeled feature information, relevant parameters in the feature classification model may be adjusted. That is, the feature classification model is trained until the first training accuracy rate of the feature classification model is greater than or equal to the first predetermined accuracy rate and the training ends, and the trained feature classification model is thereby obtained. According to a species image, the feature classification model may also output a plurality of candidate features. Each candidate feature may have its corresponding feature confidence coefficients for further analysis and screening.

Further, the feature classification model obtained by training may also be tested, and the following steps are specifically included.

A specific proportion of species images are determined from the first sample set as a first test set.

A first model accuracy rate of the trained feature classification model is determined by using the first test set.

When the first model accuracy rate is less than a second predetermined accuracy rate, the first training set and/or the feature classification model are adjusted for retraining.

In general, the species images in the first test set and in the first training set are not identical. Therefore, the first test set may be used to test whether the feature classification model also has a good identification effect on species images other than the first training set. In the testing process, the first model accuracy rate of the feature classification model is calculated by comparing the outputted feature information generated according to the species images in the first test set and the labeled feature information. In some examples, the calculation method of the first model accuracy rate may be the same as the calculation method of the first training accuracy rate. When the first model accuracy rate obtained by testing is less than the second predetermined accuracy rate, it indicates that the identification effect of the feature classification model is not good enough, and thus the first training set may be adjusted. To be specific, for instance, the number of species images labeled with the feature information in the first training set may be increased, the feature classification model itself may be adjusted, or both may be adjusted. The feature classification model is then retrained to improve its identification performance. In some embodiments, the second predetermined accuracy rate may be set equal to the first predetermined accuracy rate.

Figure 7:
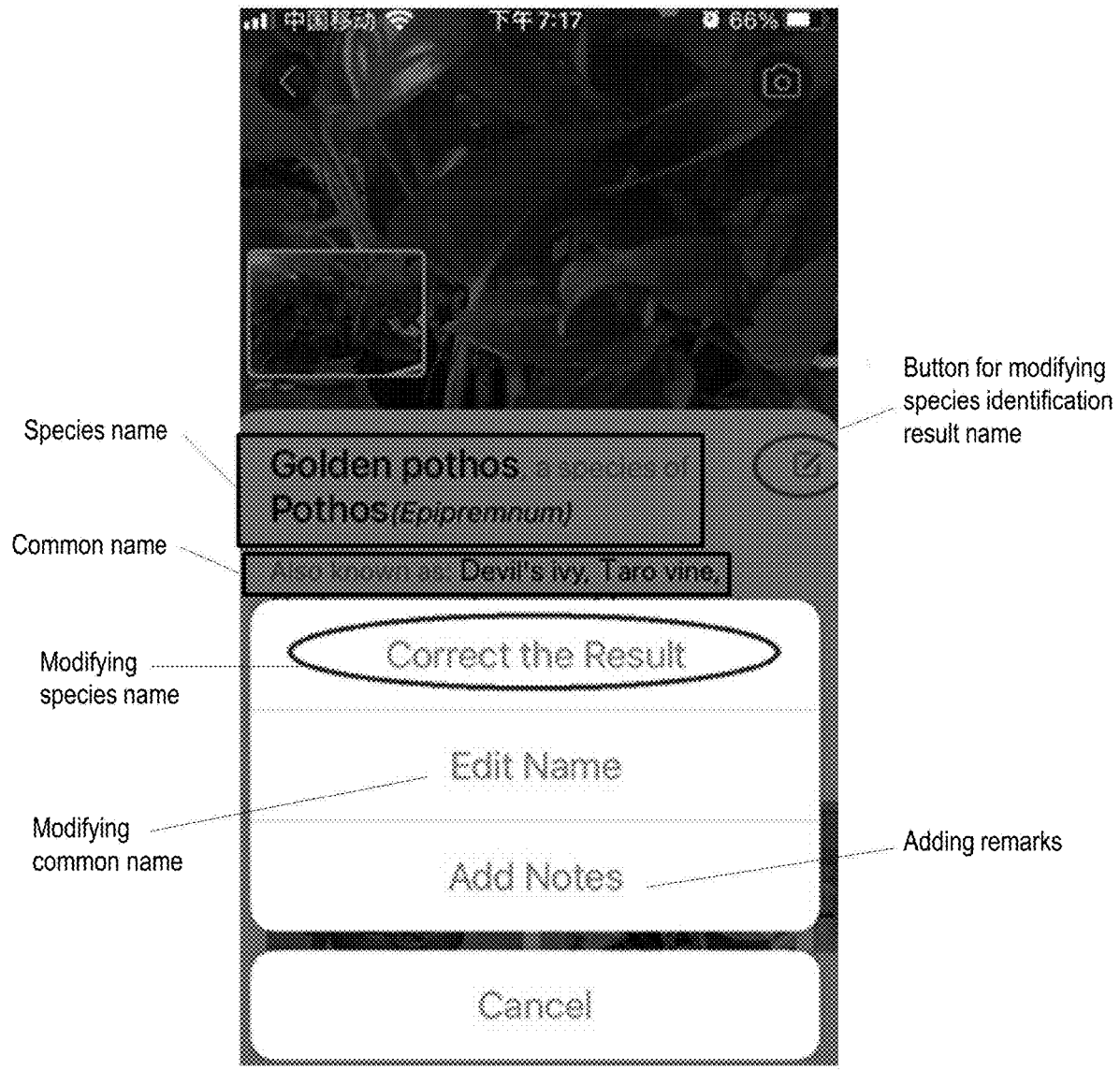
FIG. 7 is a schematic picture of modification of a species identification result name according to another embodiment of the disclosure.

According to the species identification model, the species image provided by the user is identified, and after the species identification result name is obtained, the user may submit modification information to the species identification result name. With reference to FIG. 7, FIG. 7 is a schematic picture of modification of a species identification result name according to another embodiment of the disclosure. In some embodiments, the species identification result name includes a species identification name and a common name. The species identification name is the professional scientific name of the species, and the common name is the conventional name of the species in a different geographical area. The modification information submitted for the species identification name is to modify the name of the species identification name in the original species identification result name. The modification information submitted for the common name may be a newly created common name when there is no common name in the original species identification result name, or a name modification for the original common name.

For instance, the species identification name is potato (professional scientific name: *Solanum tuberosum* L.), and its common names in different geographical areas of China are expressed as yam egg, foreign taro, foreign mountain taro, foreign taro root, fragrant taro, foreign sweet potato, mountain taro, sun taro, ground egg, spud, etc. Potato has different common names in different countries, such as Irish jicama in the United States, Dutch potato in Russia, ground apple in France, ground pear in Germany, ground bean in Italy, and baba in Peru. Another example is qiezi (professional name: *Solanum melongena*), which is called eggplant in the United States, Australia, New Zealand, and parts of Canada, aubergine in the United Kingdom, Ireland, Quebec of Canada, and most of Western Europe, and brinjal in South Asia such as India and Pakistan, Singapore, Malaysia, and South Africa.

A user may click the button for modifying the species identification result name on the identification result page to submit the modification information, including "Correct the Result" to modify the species identification name in the species identification result name and "Edit Name" to modify the common name, and the user may also click "Add Notes" to add remarks.

In some embodiments, after the modification information of the species identification result name of a specific species is submitted by the user, an image belonging to the same species and subsequently provided by the current user use the modified species identification result name submitted by the user, to avoid repeated modification by the user. When the user later believes that the modified species identification result name submitted by the user himself/herself is incorrect and submits the modification information again, the re-modified information is treated as the species identification result name of the image belonging to the same species provided by the current user. The modification information of the species identification result name submitted by the user includes the species identification name and/or the common name. For instance, when the user thinks that the species identification name in the identification result of a species image is rose is inaccurate and thereby submits modification information to change the species identification name to China rose, then when the same species image is submitted again for species identification, the China rose is uniformly used as the species identification name. When the user later believes that the previous determination is incorrect and changes the species identification name to rose or other species identification name again, then when the user submits the same species image, the latest modification information is uniformly used as the species identification name. The same principle applies to the modification rules for common names.

When the modification information submitted by the user for the species identification result name is obtained, the number of times of modification belonging to the same modification information among the pieces of modification information submitted by multiple users may also be counted and accumulated. In some embodiments, when the number of times of modification of the same modification information among the pieces of modification information for a species identification result name submitted by multiple users is greater than a predetermined first threshold, the same modification information is treated as the species identification result name of the species, and the species identification model is optimized according to the species identification result name and the corresponding species images. For instance, for a species whose species identification name is qiezi (professional scientific name: *Solanum melongena*), when multiple users submit modification information for the common name, and when a new or modified common name is eggplant, the cumulative count value of the number of times of modification of the modification information as eggplant is automatically recorded. When the number of times of modification is greater than the predetermined first threshold (e.g., 20 times, 50 times, or other predetermined values), eggplant is displayed as its common name. For another instance, regarding the species identification result name of a specific species, if multiple users submit the modification information of the species identification name and aims to change the species identification name from eggplant to purple cloud pepper (also known as purple facing heaven pepper because it is purple and looks like eggplant, so it is easy to be misidentified), when the number of times of modification is greater than the predetermined first threshold (e.g., 50 times, 100 times, or other predetermined values, the value setting is only for illustration and is not limited thereto), the species identification name of the species picture with the same features is modified to purple cloud pepper (or purple facing heaven pepper). At the same time, the species identification model is optimized according to the species identification result name and the corresponding multiple species images, so that the subsequently submitted species pictures with the same features may be automatically identified as purple cloud pepper (or purple facing heaven pepper).

In some embodiments, when the numbers of times of modification of pieces of modification information of different species identification result names of a specific species are all greater the predetermined first threshold, the pieces of modification information of the different species identification result names are sorted according to the numbers of times of modification, and the piece modification information ranked first is treated as the species identification result name of the species. The sorted pieces of modification information of the different species identification result names are treated as the candidate species identification result names, and species identification result name is adjusted according to the candidate species identification result names. For instance, the piece of modification information ranked first is treated as the species identification result name of the species. For instance, regarding the species identification result name of a specific species, some users may submit the modification information of the species identification name aiming to change the species identification name from eggplant to purple cloud pepper, and other users may aim to modify the species identification name to dwarf eggplant or long eggplant. In this case, the purple cloud pepper, dwarf eggplant, and long eggplant are treated as the candidate species identification result names. Among these names, the number of times of modification of the purple cloud pepper ranks first, then the purple cloud pepper is treated as the species identification result name of this species.

In some embodiments, if the confidence coefficient of the species identification name in the species identification result name is greater than a second predetermined threshold and modification information for the current species identification name is submitted by a user, reminder information is outputted. The identification result outputted by the species identification model may include one or more classifications, and these classifications are usually ranked from highest to lowest according to the confidence coefficients. The classification with the highest confidence coefficient may be considered as the classification that best matches the features of the object to be identified presented in the image (the classification is close to the confidence level of the real classification). When the confidence coefficient of the species identification name in the species identification result name is greater than the second predetermined threshold (e.g., set to 0.8), it may be considered that the current identification result has a high confidence level, and the user is not advised to make modification. Therefore, when a user submits the modification information for the current species identification name, the reminder information may be outputted. For instance, the user is informed that the current recognition result has a high confidence coefficient and is asked to carefully consider whether to confirm the modification, or key feature information of the current species is provided, so that the user may distinguish and confirm whether to make modification or not.

In some embodiments, when the modification information of a specific species identification name submitted by a plurality of users does not belong to a range of the species identification result name of the species identification model, the number of times of modification of the same modification information submitted by the users is acquired. When the number of times of modification is greater than a third predetermined threshold, the species identification model is used to perform sample training on the same modification information and the corresponding species images to establish an added identifiable species belonging to the species identification model. For instance, when the modification information of the "purple cloud pepper" submitted by a plurality of users does not belong to the range of the species identification result name of the species identification model, that is, the "purple cloud pepper" is not included in the range of species that can be identified by the species identification model, and when the number of times of modification of the modification information of the "purple cloud pepper" submitted by the users is greater than the third predetermined threshold (e.g., 50 times, 100 times, or other predetermined values, the value setting is only for illustration and is not limited thereto), a task of adding new identifiable species is established for the species identification model. Sample training is performed by using multiple species images corresponding to the modification information of "purple cloud pepper" submitted by the users to update the species identification model, so that the species identification model may identify the added species "purple cloud pepper".

In some embodiments, when a plurality of users submit the same modification information among the pieces of modification information of the common name of a specific species identification result name, the number of times of modification of the same modification information and corresponding location information of the users are acquired. When the location information of the users submitting same common name modification information has a same regional attribute and the number of times of modification of the same common name modification information with the same regional attribute exceeds a fourth threshold, the same common name modification information is treated as the common name in the species identification result name submitted by subsequent users with the same regional attribute. The location information where the user is located may be determined by the location information when the species image is uploaded, and the location information includes but not limited to GPS information. To be specific, the current location information of the user is acquired when the user uploads the species image. If the current location information of the user is displayed as "The Bund of Shanghai", it may be determined that the geographical area information where the user is located is Shanghai, China. If the current location information of the user is displayed as "Columbia University, New York State", it is determined that the geographical area information of the user is New York State, USA. The location information of a user may be divided into hierarchical attributes of multiple regions according to a range from small to large. For instance, the user's current location information is Binjiang District, Hangzhou City, Zhejiang Province, China, and the multiple hierarchical attributes may be Binjiang District, Hangzhou City, Zhejiang Province, China, East Asia, Asia and other regions in sequence. For instance, regarding a species whose species identification name is qiezi (professional scientific name: *Solanum melongena*), when users whose regional attributes including the United States submit the common name modification information to modify to "eggplant", and the number of times of modification exceeds the fourth threshold (e.g., 50 times, 100 times, or other predetermined values, the value setting is only for illustration and is not limited thereto), when other subsequent users whose regional attributes include the United States submit species images of qiezi (professional scientific name: *Solanum melongena*) for identification, "eggplant" is used as the common name in the species identification result name of the users. Similarly, when users whose regional attributes including the United Kingdom submit the common name modification information to modify to "aubergine", and the number of times of modification exceeds the fourth threshold, when other subsequent users whose regional attributes include the United Kingdom submit species images of qiezi (professional scientific name: *Solanum melongena*) for identification, "aubergine" is used as the common name in the species identification result name of the users.

In some embodiments, when numbers of pieces of the same common name modification information of a specific species with the same regional attribute are submitted, the pieces of the same common name modification information are sorted and displayed according to the number of times of modification. For instance, regarding a species whose species identification name is qiezi (professional scientific name: *Solanum melongena*), when the numbers of times of modification of the common name modification information of "eggplant" and "aubergine" submitted by users whose regional attributes include Canada both exceed the fourth threshold, when other subsequent users whose regional attributes include Canada submit species images of qiezi (professional scientific name: *Solanum melongena*) for identification, the "eggplant" and "aubergine" are treated as the common names and are sorted and displayed according to the numbers of times of modification.

In some embodiments, the location information of the users includes regular location information and current location information, and the regular location information is set by the users or acquired according to the location information with a largest number of occurrences acquired from historical species images of the users. A user may set his/her own default location information, or a system may assist in determining the location information. The location information automatically positioned when the user uses the system for the first time may also be treated as initial location information.

When the current location information of the species picture of a specific species provided by the user is inconsistent with the regular location information of the user, in addition to displaying the common name of the species corresponding to the regional attribute to which the regular location information of the user belongs, the common name of the species corresponding to the regional attribute to which the user's current location information belongs is also displayed. For instance, if a user's regular location information is the United States, and the current location information becomes the United Kingdom, then when the user submits a species image of qiezi (professional scientific name: *Solanum melongena*) for identification, both "eggplant" and "aubergine" are displayed as its common names, so that the common local names of this species may be known.

An embodiment of the disclosure further provides a readable storage medium storing a program, and the program implements the abovementioned method for displaying species identification result names when being executed.

Further, the disclosure provides a system for displaying species identification result names, and the system includes a processor and a memory. The memory stores a program, and the program implements the abovementioned method for displaying species identification result names when being executed by the processor.

In view of the foregoing, in the embodiments of the disclosure, a species name database is pre-established. The species name database records common names of a same species in different geographical areas. After an image uploaded by a user is acquired, the species name in the image is identified by the species identification model first, and it is then determined whether the species name is present in the pre-established species name database. If yes is determined, the geographical area information where the user is located is acquired, the conventional name of the species name corresponding to the geographical area information is selected from the species name database, and the identification result of the species is acquired and outputted. In the disclosure, when the species to be identified has the conventional name of the current geographical area, the species name identified by the species identification model is not directly outputted to the user. Instead, according to the species name, the conventional name of the species to be identified in the current geographical area is determined from the species name database and is outputted to the user. Compared with the related art, in the disclosure, the species to be identified in the current geographical area is treated as the identification result and is displayed to the user, and improved user experience is thereby provided.

It should be noted that the various embodiments in this specification are described in a related manner, and the same or similar parts between the various embodiments may be referred to each other. Each embodiment focuses on the differences from other embodiments. In particular, as for the device, the electronic apparatus, and the computer-readable storage medium, since they are basically similar to that provided in the method embodiments, description thereof is simple. For the related part, please refer to the description of the method embodiments.

In the specification, relational terms such as first and second are only used to indicate the distinction between an entity or operation and another entity or operation, and do not necessarily require or imply any such actual relationship or order between these entities or operations. Moreover, the terms "including", "comprising", or any other variations thereof are intended to cover non-exclusive inclusion, so that a process, method, object, or device including a series of elements includes not only those elements, but also other elements that are not explicitly listed, or includes elements inherent to the process, method, object, or device. If there are no more restrictions, the element defined by the sentence "including a . . . " does not exclude the existence of other identical elements in the process, method, article, or device that includes the element. The terms used herein is for the purpose of describing particular embodiments only and is not intended to limit the disclosure. As used herein, the singular forms "a", "an", and "the" are intended to include the plural forms as well, unless the context clearly dictates otherwise. As used herein, the term "and/or" includes any and all combinations of one or more of the associated listed items. When a statement such as "at least one of" follows a list of elements, it modifies the entire list of elements, not the individual elements in the list. As used herein, the terms "substantially", "about", and similar terms are used as terms of approximation, rather than terms of degree, and are intended to represent the inherent deviation in measurements or calculations that would be recognized by a person having ordinary skill in the art. Further, the use of "may" in describing embodiments of the disclosure refers to "one or more embodiments of the disclosure". As used herein, the terms "use", "using", and "used" may be considered synonymous with the terms "utilizes", "utilizing", and "utilized", respectively. Likewise, the term "exemplary" is intended to indicate an instance or instances.

The foregoing description is only a description of the preferred embodiments of the disclosure, and does not limit the scope of the disclosure in any way. Any changes or modifications made by a person having ordinary skill in the art of the disclosure based on the foregoing disclosure shall fall within the protection scope of the claims.

What is claimed is:

1. A method for acquiring species identification names, comprising:
    identifying a species image provided by a user according to a species identification model and acquiring a species name;
    acquiring a plurality of candidate species names according to a species name database; and
    acquiring a species identification result name according to geographical area information and/or confidence coefficients of the candidate species names;
    wherein the candidate species names comprise a plurality of conventional names, and the step of acquiring the candidate species names according to the species name database comprises:
    determining whether the species name is present in the species name database, which is pre-established, wherein the species name database records common names of a same species in different geographical areas; and
    acquiring the geographical area information where the user is located in response to presence of the species name in the species name database;
    wherein the candidate species names comprise pieces of modification information, the confidence coefficients are related to a number of times of modification, the species name database comprises the modification information submitted by the user, and the step of acquiring the candidate species names according to the species name database further comprises:
    acquiring the modification information submitted by the user for the species identification result name and the number of times of modification belonging to the same modification information among the pieces of the modification information submitted by a plurality of users; and
    determining a candidate species identification result name according to the modification information submitted by the user and the number of times of modification to increase an accuracy of the candidate species identification result name.

2. The method for acquiring the species identification names according to claim 1, wherein the species identification model is a model, which is pre-trained and pre-established based on a neural network, and the species image comprises a species, which is to be identified.

3. The method for acquiring the species identification names according to claim 1, wherein the species identification result name comprises an identification result of the species, and the step of acquiring the species identification result name according to the geographical area information and/or the confidence coefficients of the candidate species names further comprises:
    selecting the common names of the species name corresponding to the geographical area information from the species name database and acquiring and outputting the identification result of the species.

4. The method for acquiring the species identification names according to claim 3, wherein if it is determined that the species name is not present in the species name database, which is pre-established, the species name is treated as the identification result of the species and is outputted.

5. The method for acquiring the species identification names according to claim 3, wherein a professional scientific name is treated as an entry for each species in the species name database, and the common names of the species in the different geographical areas are correspondingly stored under the entry.

6. The method for acquiring the species identification names according to claim 3, wherein the step of outputting the identification result of the species further comprises:
    outputting species information, the common names in other geographical areas, and/or a professional scientific name of the species.

7. The method for acquiring the species identification names according to claim 3, wherein when the species identification model identifies that the species name in an image comprises a plurality of species names of a plurality of similar species, and all of the species names are present in the species name database, which is pre-established,
    the step of selecting the conventional name of the species name corresponding to the geographical area information from the species name database as the identification result of the species and outputting the identification result of the species comprises:
performing the following step for each of the species names:
selecting the conventional name of the species name corresponding to the geographical area information from the species name database as one of the identification result of the species and outputting the identification result of the species.

8. The method for acquiring the species identification names according to claim 7, further comprising:
sequentially outputting a plurality of identification results of the species according to a descending arrangement order of accuracy rates of the plurality of species names regarding the species names of the plurality of similar species, which are identified.

9. The method for acquiring the species identification names according to claim 3, further comprising:
receiving a suggested name of the species uploaded by the user; and
associating and storing the species name, the geographical area information, and the suggested name.

10. The method for acquiring the species identification names according to claim 9, further comprising:
determining whether storage records of the species name, the geographical area information, and the suggested name exceed a predetermined threshold; and
recording the suggested name in the species name database as the conventional name of the species name in a geographical area corresponding to the geographical area information if yes is determined.

11. A non-transitory computer-readable storage medium, wherein the computer-readable storage medium stores a computer program, and the computer program is executed by a processor to implement the method according to claim 1.

12. An electronic apparatus, comprising a processor, a communication interface, a memory, and a communication bus, wherein the processor, the communication interface, and the memory communicate with one another through the communication bus,
the memory is configured to store a computer program, and
the processor is configured to implement the method according to claim 1 when storing the computer program stored in the memory.

13. The method for acquiring the species identification names according to claim 1, wherein the step of acquiring the species identification result name according to the geographical area information and/or the confidence coefficients of the candidate species names further comprises:
adjusting the species identification result name according to the candidate species identification result name.

14. The method for acquiring the species identification names according to claim 13, wherein after the modification information of the species identification result name of a specific species is submitted by the user, an image belonging to a same species and subsequently provided by a current user use a modified species identification result name submitted by the user.

15. The method for acquiring the species identification names according to claim 13, wherein when the number of times of modification of the same modification information among the pieces of the modification information for the species identification result name submitted by the plurality of users is greater than a predetermined first threshold, the same modification information is treated as the species identification result name of the species, and the species identification model is optimized according to the species identification result name and a plurality of the species image, which are corresponding to the species identification result name.

16. The method for acquiring the species identification names according to claim 15, wherein when the number of times of modification of pieces of modification information of different species identification result names of a specific species are all greater the predetermined first threshold, the pieces of the modification information of the different species identification result names are sorted according to the number of times of modification, and the piece of the modification information ranked first is treated as the species identification result name of the species.

17. The method for acquiring the species identification names according to claim 13, wherein the species identification result name comprises a species identification name and a common name.

18. The method for acquiring the species identification names according to claim 17, wherein if the confidence coefficient of the species name in the species identification result name is greater than a second predetermined threshold and the modification information for the current species identification name is submitted by the user, reminder information is outputted.

19. The method for acquiring the species identification names according to claim 17, wherein when the modification information of a specific species identification name submitted by a plurality of users does not belong to a range of the species identification result name of the species identification model, the number of times of modification of the same modification information submitted by the users is acquired, and when the number of times of modification is greater than a third predetermined threshold, the species identification model is used to perform sample training on the same modification information and a plurality of the species image, which are corresponding to the modification information, to establish an added identifiable species belonging to the species identification model.

20. The method for acquiring the species identification names according to claim 17, wherein when the plurality of users submit the same modification information among the pieces of the modification information of the common name of a specific species identification result name, the number of times of modification of the same modification information and location information, which are corresponding to the plurality of users, are acquired, and when the location information of the plurality of users submitting same common name modification information has a same regional attribute and the number of times of modification of the same common name modification information with the same regional attribute exceeds a fourth threshold, the same common name modification information is treated as the common name in the species identification result name submitted by subsequent users with the same regional attribute.

21. The method for acquiring the species identification names according to claim 20, wherein when a number of pieces of the same common name modification information of a specific species with the same regional attribute are submitted, the pieces of the same common name modification information are sorted and displayed according to the number of times of modification.

22. The method for acquiring the species identification names according to claim 20, wherein the location information of the users comprise regular location information and current location information, and the regular location information is set by the users or acquired according to the location information with a largest number of occurrences acquired from historical species images of the users.

23. The method for acquiring the species identification names according to claim 22, wherein when the current location information of a species picture of a specific species provided by the user is inconsistent with the regular location information of the user, in addition to displaying the common name of the species corresponding to the regional attribute to which the regular location information of the user belongs, the common name of the species corresponding to the regional attribute to which the user's current location information belongs is also displayed.

24. A device for acquiring species identification names, comprising:
- an acquisition module, configured to acquire an image uploaded by a user, wherein the image comprises a species to be identified;
- an identification module, configured to identify a species name in the image through a pre-trained and a species identification model, which is pre-established, wherein the species identification model is a model based on a neural network;
- a determination module, configured to determine whether the species name is present in a pre-established species name database, wherein the pre-established species name database records common names of a same species in different geographical areas; and
- an output module, configured for acquiring geographical area information where the user is located in response to presence of the species name in the pre-established species name database, selecting a conventional name of the species name corresponding to the geographical area information from the pre-established species name database, and acquiring and outputting an identification result of the species;

wherein candidate species names comprise a plurality of conventional names, and the device acquires the candidate species names according to the species name database comprising:

determining whether the species name is present in the species name database, which is pre-established, wherein the species name database records common names of a same species in different geographical areas; and acquiring the geographical area information where the user is located in response to presence of the species name in the species name database;

wherein the candidate species names comprise pieces of modification information, confidence coefficients are related to a number of times of modification, the species name database comprises the modification information submitted by the user, and the device acquires the candidate species names according to the species name database further comprising:

acquiring the modification information submitted by the user for species identification result name and the number of times of modification belonging to the same modification information among the pieces of the modification information submitted by a plurality of users; and determining a candidate species identification result name according to the modification information submitted by the user and the number of times of modification to increase an accuracy of the candidate species identification result name.

* * * * *